US012686430B2

(12) United States Patent
He

(10) Patent No.: US 12,686,430 B2
(45) Date of Patent: Jul. 21, 2026

(54) METHOD AND APPARATUS FOR STEERING WHEEL TOUCH DETECTION

(71) Applicant: VALEO INTERIOR CONTROLS (SHENZHEN) CO., LTD, Shenzhen (CN)

(72) Inventor: Chuan He, Shenzhen (CN)

(73) Assignee: VALEO INTERIOR CONTROLS (SHENZHEN) CO. LTD, Shenzhen (CN)

( * ) Notice: Subject to any disclaimer, the term of this patent is extended or adjusted under 35 U.S.C. 154(b) by 212 days.

(21) Appl. No.: 18/559,995

(22) PCT Filed: May 10, 2022

(86) PCT No.: PCT/CN2022/091913
§ 371 (c)(1),
(2) Date: Nov. 9, 2023

(87) PCT Pub. No.: WO2022/237759
PCT Pub. Date: Nov. 17, 2022

(65) Prior Publication Data
US 2024/0246598 A1 Jul. 25, 2024

(30) Foreign Application Priority Data

May 10, 2021 (CN) .......................... 202110504172.2

(51) Int. Cl.
| | |
|---|---|
| *B62D 1/04* | (2006.01) |
| *G01V 3/02* | (2006.01) |
| *G01V 3/08* | (2006.01) |

(52) U.S. Cl.
CPC .............. B62D 1/046 (2013.01); G01V 3/02 (2013.01); G01V 3/088 (2013.01)

(58) Field of Classification Search
CPC . B62D 1/046; B62D 1/06; G01V 3/02; G01V 3/088; H03K 2217/94026
See application file for complete search history.

(56) References Cited

U.S. PATENT DOCUMENTS

| | | | |
|---|---|---|---|
| 2003/0234769 A1* | 12/2003 | Cross ................... | G06F 3/0447 345/173 |
| 2007/0194840 A1 | 8/2007 | Dathe et al. | |

(Continued)

FOREIGN PATENT DOCUMENTS

| | | |
|---|---|---|
| CN | 105260077 A | 1/2016 |
| CN | 107831369 A | 3/2018 |

(Continued)

OTHER PUBLICATIONS

International Search Report and Written Opinion in corresponding International Application No. PCT/CN2022/091913, dated Jun. 22, 2023 (9 pages).

(Continued)

*Primary Examiner* — Dominic E Hawkins
(74) *Attorney, Agent, or Firm* — Osha Bergman Watanabe & Burton LLP

(57) ABSTRACT

A method for steering wheel touch detection is disclosed. The steering wheel is partitioned into at least one touch detection region and each touch detection region includes at least one touch detection sensor that is provided with a touch detection channel. For each touch detection channel, the method includes configuring a reference load with a preset capacitance value and reference resistance value, measuring a capacitance value and resistance value of the reference load, and determining from the reference and measured capacitance and resistance values whether the operation of the touch detection channel is normal. If the operation of the touch detection channel is normal, the touch detection (Continued)

channel is used to perform touch detection of the steering wheel based on measured resistance and capacitance.

15 Claims, 4 Drawing Sheets

(56) References Cited

U.S. PATENT DOCUMENTS

| | | | | |
|---|---|---|---|---|
| 2013/0239733 A1* | 9/2013 | Nishijima | ................ | B62D 1/06 |
| | | | | 74/484 R |
| 2015/0330931 A1* | 11/2015 | Fujikawa | ............... | G01N 27/22 |
| | | | | 324/663 |
| 2016/0216836 A1* | 7/2016 | Yao | ................... | G06F 3/041661 |
| 2019/0185039 A1* | 6/2019 | Park | .................... | B62D 15/029 |
| 2019/0220115 A1* | 7/2019 | Mori | ..................... | G06F 3/0446 |
| 2020/0371144 A1 | 11/2020 | Seo et al. | | |
| 2022/0300141 A1* | 9/2022 | Dou | ........................ | G06F 3/044 |

FOREIGN PATENT DOCUMENTS

| | | |
|---|---|---|
| CN | 108216019 A | 6/2018 |
| CN | 111596802 A | 8/2020 |
| CN | 111811829 A | 10/2020 |
| CN | 111959606 A | 11/2020 |
| CN | 111984143 A | 11/2020 |
| CN | 112124322 A | 12/2020 |
| CN | 112166065 A | 1/2021 |
| CN | 112298352 A | 2/2021 |
| CN | 112611402 A | 4/2021 |
| CN | 112684507 A | 4/2021 |
| DE | 102014016422 A1 | 5/2016 |
| DE | 102014117823 A1 | 6/2016 |
| FR | 3065294 A1 | 10/2018 |
| FR | 3081224 A1 | 11/2019 |
| JP | 2020-117025 A | 8/2020 |

OTHER PUBLICATIONS

Supplementary European Search Report in corresponding European Application No. 22806722, dated Apr. 22, 2025 (8 pages).
Office Action in corresponding Chinese Application No. 202110504172.2, dated Apr. 21, 2026 (20 pages).

* cited by examiner

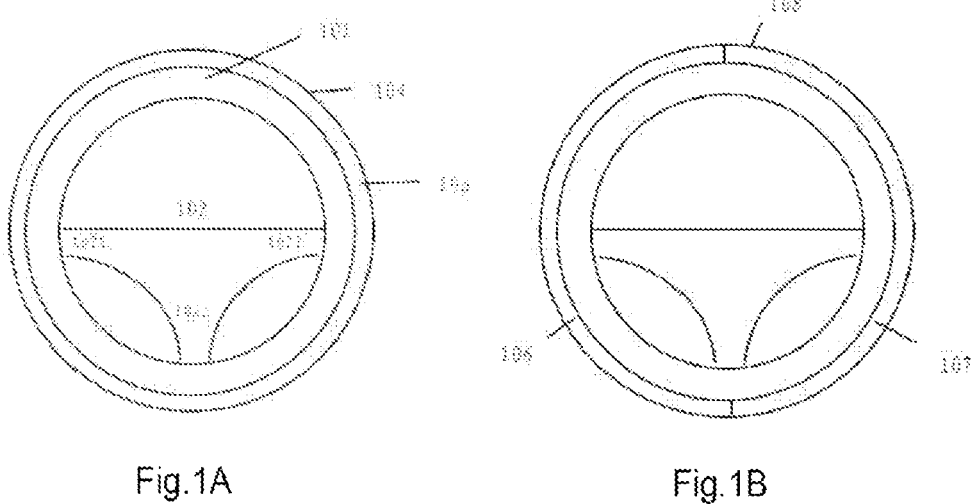
Fig.1A                  Fig.1B
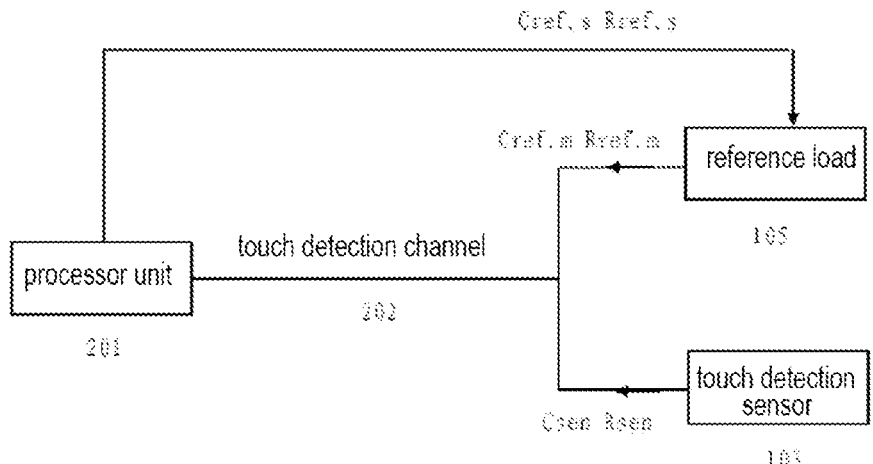
Fig.2A

METHOD AND APPARATUS FOR STEERING WHEEL TOUCH DETECTION

TECHNICAL FIELD

The present disclosure relates to the field of steering wheel hands-off detection; more specifically, the present disclosure relates to a method and apparatus for steering wheel touch detection.

BACKGROUND ART

In the driving of a vehicle, it is necessary for a driver to operate steering by means of a steering wheel; in addition, with the development of science and technology, the driver is further able to perform operations such as multimedia control and driving assistance settings by means of the steering wheel. Therefore, in order to improve the safety of driving, it is necessary to monitor whether the driver's hands are properly placed on a steering wheel and performing controlled driving. For example, the United Nation's most recently revised UN R79 regulation requires that vehicles equipped with a LKAS (lane keeping assist system) must detect whether the driver is gripping the steering wheel.

In today's ADASs (advanced driver-assistance systems), in advanced-level autonomous driving (such as L2-L4) situations, the vehicle itself can autonomously control driving, and the driver can remove their hands from the steering wheel. However, in certain situations, the driver is required to regain control rights, and a definite distinction in time between the driver controlling the vehicle and the vehicle driving autonomously is necessarily required.

By means of applying HOD (hands-off detection) technology to a steering wheel, whether a driver is gripping the steering wheel can be detected. Today, there are many ways to implement HOD; for example, a pressure sensing means, a capacitance sensing means, etc. In a situation in which HOD is implemented by a pressure sensing means, a pressure sensor is fitted to a steering wheel, and a pressure change is detected by means of the pressure sensor. However, an HOD solution based on pressure change is affected by the individual amount of physical strength used by a driver gripping the steering wheel, which tends to produce judgment errors, and thus affects the accuracy of HOD. In the implementation of HOD by a capacitance sensing means commonly used today, a capacitance sensor is arranged on the outer ring of a steering wheel. When a driver places or removes their hand on/from the steering wheel, it causes a change in a capacitance value of parasitic capacitance; the capacitance sensor measures this change, and records whether the driver's hand is gripping the steering wheel. However, defects of HOD by a capacitance sensing means lie in that: when the driver wears gloves, the detection sensitivity decreases; and when other parts of the body accidentally touch the steering wheel, or when someone deliberately or accidentally uses a substitute, which causes a capacitance change, to touch the steering wheel, HOD wrongly detects this as a driver's hand being on the steering wheel.

In order to achieve efficient and reliable HOD, the semiconductor company ams, on the basis of capacitance measurement technology, has provided a high-precision sensor AS8579 based on an impedance measurement principle of an IQ demodulation technique. The sensor AS8579 generates a sine wave, by means of a transmitting module, to drive a load, a receiving module measures the current of the load, and then converts the current into a voltage, and demodulates same to in-phase (I) and orthogonal phase (Q), and an external processor can read an I value and a Q value, and calculate the corresponding resistance value and reactance value. The HOD solution based on AS8579 does not require application of a special pressure to the steering wheel, and, by means of high-resolution detection, can prevent effects caused by a single finger or knee.

In order to satisfy requirements of ASIL (Automotive Safety Integrity Level) C/D in the ISO 26262 ASILs of the automotive industry, all parts within the scope of the entire vehicle system are required to have very high robustness or self-test functions. However, with regard to widely used HOD sensors, such as the AS8579 sensor, same can only ensure the ASIL B safety level is supported; therefore, additionally checking whether the HOD sensor itself is functioning normally is crucial for increasing the safety level of the entire vehicle.

SUMMARY OF THE INVENTION

With regard to the above-mentioned problem, the present disclosure provides a method for steering wheel touch detection; the method, on the basis of the steering wheel touch detection method mentioned previously, by means of adding an extra reference load, simply, inexpensively and reliably checks whether HOD of a steering wheel functions normally.

An embodiment of the present disclosure provides a method for steering wheel touch detection, wherein the steering wheel is partitioned into at least one touch detection region, each touch detection region comprises at least one touch detection sensor, and each touch detection sensor is provided with a touch detection channel corresponding thereto, and the method comprises: for said each touch detection channel, a reference load, for testing by the touch detection channel, is configured with a preset reference capacitance value and reference resistance value; the touch detection channel is used to measure a capacitance value and resistance value of the reference load; on the basis of the preset reference capacitance value and reference resistance value, and the measured capacitance value and resistance value, it is determined whether the operation of the touch detection channel is normal; and in a situation in which it is determined that the operation of the touch detection channel is normal, the touch detection channel is used to measure a capacitance value and resistance value of a touch detection sensor corresponding thereto, and touch detection of the steering wheel is performed on the basis of the measured capacitance value and resistance value of the touch detection sensor.

According to an embodiment of the present disclosure, for said each touch detection channel, the preset reference capacitance value and reference resistance value corresponding thereto are non-constants.

According to an embodiment of the present disclosure, determining whether the operation of the touch detection channel is normal, on the basis of the preset capacitance value and preset resistance value, and the measured capacitance value and resistance value, comprises: when the measured capacitance value deviates from the preset reference capacitance value within a predetermined deviation range, and when the measured resistance value deviates from the preset reference resistance value within a predetermined deviation range, determining that the operation of the touch detection channel is normal, otherwise determining that a fault has occurred in the touch detection channel.

According to an embodiment of the present disclosure, the reference load is connected to the touch detection channel by means of a switch apparatus, the switch apparatus is switched off during the process of measuring the touch detection sensor, and the switch apparatus is switched on during the process of measuring the reference load.

According to an embodiment of the present disclosure, the method further comprises: in a situation in which it is determined that the operation of the touch detection channel is faulty, adjusting the preset reference capacitance value and reference resistance value of the reference load, using the touch detection channel to measure the capacitance value and resistance value of the reference load after adjustment; and on the basis of the preset reference capacitance value and reference resistance value, and the measured capacitance value and resistance value, determining whether the operation of the touch detection channel is normal.

According to an embodiment of the present disclosure, the touch detection channel is an IQ modulation-demodulation touch detection channel, wherein the touch detection channel being used to measure a capacitance value and resistance value of the reference load, comprises: applying a first carrier signal to the reference load; modulating the first carrier signal, by means of the capacitance value and resistance value of the reference load, to obtain a first carrier modulated signal; and using the touch detection channel to perform IQ demodulation on the first carrier modulated signal, to obtain a capacitance value and resistance value of the reference load.

According to an embodiment of the present disclosure, the touch detection channel being used to measure a capacitance value and resistance value of the touch detection sensor corresponding thereto, comprises: applying a second carrier signal to the touch detection sensor; modulating the second carrier signal, by means of the touch detection sensor, to obtain a second carrier modulated signal; and using the touch detection channel to perform IQ demodulation on the second carrier modulated signal, to obtain a capacitance value and resistance value of the touch detection sensor.

According to an embodiment of the present disclosure, the first carrier signal and the second carrier signal are provided with the same carrier waveform and carrier frequency.

An embodiment of the present disclosure further comprises: in a situation in which it is determined that the operation of the touch detection channel is faulty, the carrier waveform and/or carrier frequency of the first carrier signal is adjusted, the adjusted first carrier signal is applied to the reference load; the adjusted first carrier signal is modulated, by means of the capacitance value and resistance value of the reference load, to obtain an updated first carrier modulated signal, and the touch detection channel is used to perform IQ demodulation on the updated first carrier modulated signal, to obtain a capacitance value and resistance value of the reference load; and on the basis of the preset reference capacitance value and reference resistance value, and the measured capacitance value and resistance value, it is determined whether the operation of the touch detection channel is normal.

According to an embodiment of the present disclosure, in a situation in which each touch detection region comprises multiple touch detection sensors, touching on the touch detection region is determined on the basis of measurement results of the multiple touch detection sensors of the touch detection region; and the method further comprises: in a situation in which the steering wheel is partitioned into multiple touch detection regions, a touch operation on the steering wheel is determined on the basis of a touch detection result of at least one of the multiple touch detection regions.

An embodiment of the present disclosure provides an apparatus for steering wheel touch detection, wherein the steering wheel is partitioned into at least one touch detection region, each touch detection region comprises at least one touch detection sensor, and the apparatus comprises: multiple touch detection channels, each touch detection channel being provided with a touch detection sensor corresponding thereto, and being used for measuring a capacitance value and resistance value of the touch detection sensor corresponding thereto; and at least one reference load, wherein each touch detection channel is provided with a reference load corresponding thereto, the reference load is configured with a preset reference capacitance value and reference resistance value, and each touch detection channel is further used for measuring the capacitance value and resistance value of the reference load corresponding thereto; and a processor unit, configured: for each touch detection channel, on the basis of the preset reference capacitance value and reference resistance value of the reference load, and the measured capacitance value and resistance value of the reference load, to determine whether the operation of the touch detection channel is normal, and, in a situation in which it is determined that the operation of the touch detection channel is normal, to perform touch detection of the steering wheel on the basis of the measured capacitance value and resistance value of the touch detection sensor.

According to an embodiment of the present invention, the processor unit is configured: when the measured capacitance value deviates from the preset reference capacitance value within a predetermined deviation range, and when the measured resistance value deviates from the preset reference resistance value within a predetermined deviation range, to determine that the operation of the touch detection channel is normal, and otherwise determine that a fault has occurred in the touch detection channel.

According to an embodiment of the present disclosure, the apparatus is provided with a switch apparatus, the reference load is connected to the touch detection channel by means of the switch apparatus, the switch apparatus is switched off during the process of measuring the touch detection sensor, and the switch apparatus is switched on during the process of measuring the reference load.

According to an embodiment of the present disclosure, the touch detection channel is an IQ modulation-demodulation touch detection channel, and the touch detection channel is configured to: apply a first carrier signal to the reference load; and perform IQ demodulation on a first carrier modulated signal to obtain a capacitance value and resistance value of the reference load, wherein the first carrier modulated signal is obtained by modulation of the first carrier signal by the capacitance value and resistance value of the reference load.

According to an embodiment of the present disclosure, the touch detection channel is configured to: apply a second carrier signal to the touch detection sensor; and perform IQ demodulation on a second carrier modulated signal to obtain a capacitance value and resistance value of the touch detection sensor, wherein the second carrier modulated signal is obtained by modulation of the second carrier signal by the touch detection sensor.

BRIEF DESCRIPTION OF THE DRAWINGS

In order to explain the technical solutions of embodiments of the present disclosure more clearly, drawings required for describing the embodiments are briefly described below. Obviously, the drawings in the description below are merely some exemplary embodiments of the present disclosure, and those skilled in the art could obtain other drawings based on these drawings without expending inventive effort.

FIG. 1A and FIG. 1B respectively show implementations of a steering wheel.

FIG. 2A shows a structural schematic diagram of an apparatus for steering wheel touch detection according to the present disclosure.

SPECIFIC EMBODIMENTS

Figure 2B:
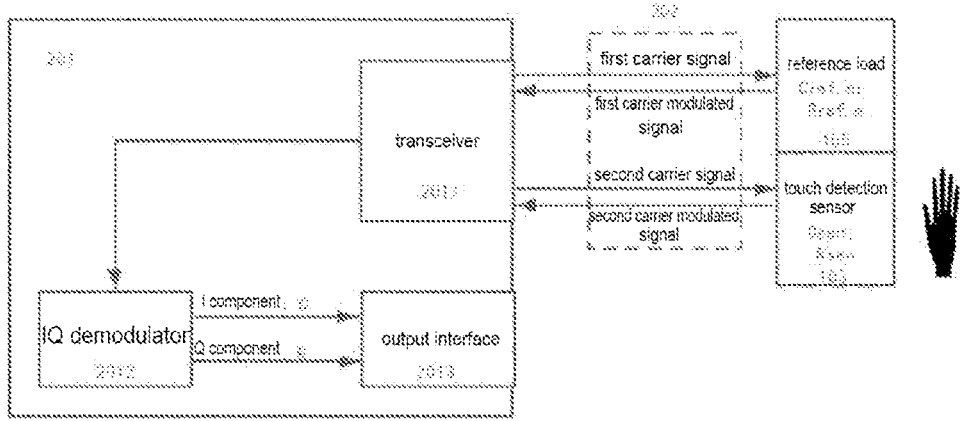
FIG. 2B shows a structural schematic diagram of an apparatus for steering wheel touch detection which has an IQ modulation-demodulation touch detection channel.

In order to make the objectives, technical solutions and advantages of the present disclosure clearer, the exemplary embodiments according to the present disclosure are described in detail below with reference to the accompanying drawings. Obviously, the described embodiments are merely some, rather than all, of the embodiments of the present disclosure; it should be understood that the present disclosure is not limited to the exemplary embodiments described herein.

In the specification and the accompanying drawings, substantially the same or similar steps and elements are denoted using the same or similar reference numerals, and repeated descriptions of these steps and elements are omitted. Moreover, in the descriptions of the present disclosure, terms such as "first" and "second" are merely used for distinguishing descriptions, and cannot be understood to indicate or imply relative importance or order.

In the specification and the accompanying drawings, elements are described in the singular or plural form according to the embodiments. However, the singular and plural forms are appropriately selected for use in the proposed case merely to facilitate explanation, and are not intended to limit the present disclosure. Therefore, the singular form may include the plural form, and the plural form may also include the singular form, unless otherwise specified in the context explicitly.

FIG. 1A shows a steering wheel. The steering wheel acts as a direction-changing wheel which is provided with a central region 102, formed by spoke portions 1021, 1022, 1023, and a wheel ring portion 101. As vehicle multimedia and ADASs (advanced driver-assistance systems) become widespread, increasingly more control functions have been integrated on the central region 102 for controlling multimedia and the ADAS, and the control functions may be implemented by means of the driver operating controllers arranged in the central region. These controllers are generally arranged at positions in the central region which the driver can easily touch with the thumbs of their left and right hands when gripping the steering wheel properly. These controllers are generally designed in the form of buttons, scroll wheels, levers, toggle switches, etc., that is, the structural forms or operating means of these controllers are intended to facilitate a driver to operate these controllers with their thumbs when gripping the steering wheel properly.

In a multi-functional steering wheel arrangement commonly seen on the market, for example, a scroll wheel for selecting from a multimedia menu and a button to enable/disable Bluetooth calling are arranged on the spoke 1021 on the left side, and a scroll wheel for checking vehicle states and a controller related to ADAS functions are arranged on the spoke 1022 on the right side. ADAS functions already used in vehicles commonly seen on the market comprise electronic police system ISA (intelligent speed adaptation), vehicular communication systems, ACC (adaptive cruise control), an LDWS (lane departure warning system), an LKAS (lane keeping assist system), a collision avoidance or pre-crash system, a night vision system, adaptive light control, a pedestrian protection system, an automatic parking system, traffic-sign recognition, blind-spot detection, driver drowsiness detection, a hill descent control system and an electric vehicle warning sound system. Most of these systems or functions turn on automatically when the vehicle starts, but some of the functions need to be manually turned on by the driver according to their own driving requirements. Therefore, the spoke 1022 on the right side is further provided with a MAIN button for turning on some ADAS functions (such as ACC and LKAS) and a CANCEL button for turning same off, and a corresponding lever for altering a cruise speed.

The wheel ring portion 101 of the steering wheel is designed to be suitable for a driver to grip. For the HOD function, the outer surface of the wheel ring portion 101 is a touch detection region 104, and a touch detection sensor 103 is arranged in the touch detection region. The touch detection sensor 103 is generally a strip-shaped flexible capacitance sensor. This type of sensor may be smoothly integrated on the wheel ring portion of the steering wheel, and is not restricted by the shape of the outer surface of the wheel ring; the touch detection sensor 103 as shown in FIG. 1A surrounds the wheel ring portion 101 of the entire steering wheel. When the driver's hand touches or grips the steering wheel, this causes a change in an impedance value, i.e. capacitance value and resistance value, of the touch detection sensor 103.

In another embodiment, the wheel ring portion of the steering wheel may further be partitioned into multiple touch detection regions. As shown in FIG. 1B, the wheel ring portion of the steering wheel is partitioned into three touch detection regions, that is, the front of the wheel ring portion is partitioned to obtain a left-side touch detection region 106 and a right-side touch detection region 107, and the back of the wheel ring portion is individually partitioned therefrom to obtain a touch detection region 108. By means of more meticulous such partitioning of touch detection regions, the state of the driver's hold on the steering wheel may be detected more precisely. In the situation mentioned of partitioning into three touch detection regions, whether the driver is using their right hand to drive, using their left hand drive and resting their hands on top of the steering wheel can be recognised by means of the three touch detection sensors.

According to an embodiment of the present disclosure, as shown in FIG. 1A, a reference load 105 is further provided independently of the steering wheel. A touch detection channel for measuring the touch detection sensor 103 is simultaneously also used for measuring the reference load 105. The reference load 105 may be provided with a preset reference capacitance value and reference resistance value. The function of the reference load, and the principle of the apparatus for touch detection according to the present disclosure are explained in more detail below with reference to FIG. 2A.

FIG. 2A shows a schematic diagram of an apparatus for steering wheel touch detection according to the present disclosure. In this embodiment, a demonstrative explanation regarding just one touch detection sensor and one reference load is provided; in situations in which there are multiple touch detection sensors and reference loads, a design with redundancy may be provided in the same way.

The apparatus for steering wheel touch detection is provided with a touch detection channel 202, which not only is used for measuring an impedance value, i.e. capacitance value Csen and resistance value Rsen, of the touch detection sensor 103, but is also used for measuring a capacitance value Cref.m and resistance value Rref.m of the reference load 105.

The apparatus is further provided with a processor unit 201, which determines whether the operation of the touch detection channel is normal, on the basis of a preset reference capacitance value Cref.s and reference resistance value Rref.s of the reference load 105, and the measured capacitance value Cref.m and resistance value Rref.m of the reference load 105, and, in a situation in which it is determined that the operation of the touch detection channel is normal, performs steering wheel touch detection on the basis of the measured capacitance value Csen and resistance value Rsen of the touch detection sensor.

In a particular embodiment, the touch detection sensor 103 is provided with a capacitive element; however, in reality, the capacitive element could not be an ideal capacitor, that is, it could not merely have a capacitance value; it would necessarily also have a resistance value. Thus, in order to more precisely detect that a change has occurred in the touch detection sensor 103 or the capacitive element thereof, it is necessary not only to take into account the capacitance value Csen but also take into account the resistance value Rsen. Therefore, the impedance value of the touch detection sensor 103 depends on the capacitance value Cref.m and resistance value Rref.m of the capacitive element thereof, and on a voltage frequency applied to the capacitive element.

Correspondingly, the reference load 103 also necessarily has a capacitance value and a resistance value. A processor unit 201 may preset same to a reference capacitance value Cref.s and a reference resistance value Rref.s, to test whether the touch detection channel 202 is operating normally. In addition, the processor unit 201 further may adjust the reference capacitance value Cref.s and reference resistance value Rref.s of the reference load 105. In order to ensure validity and reliability of verification, and remove the influence of the environment and circuit faults on the reference load, it is necessary for the reference capacitance value Cref.s and reference resistance value Rref.s of the reference load to be non-constant, that is variable. This is because for a reference load of fixed values, as the environment changes, the reference capacitance value and reference resistance value of the reference load 103 slowly change under the effects of temperature and aging. In addition, if the processor unit 201, at this time, further compares the originally recorded reference capacitance value/reference resistance value, it will certainly produce a wrong judgment. In a particular embodiment, before the impedance value of the touch detection sensor 103 is measured each time, the reference capacitance value Cref.s and reference resistance value Rref.s of the reference load may be changed, or may be randomly set within a fixed range.

According to an embodiment of the present disclosure, the touch detection channel 202 is an IQ modulation-demodulation touch detection channel, as shown in FIG. 2B. The processor unit 201 applies a first carrier signal, for example a sinusoidal signal, to the reference load 105 by means of a transceiver 2011, via the touch detection channel 202; the capacitance value Cref.m and resistance value Rref.m of the reference load 105 modulate the first carrier signal to obtain a first carrier modulated signal; and the transceiver receives the first carrier modulated signal and transmits same to an IQ demodulator 2012. The received first carrier modulated signal may be demodulated to obtain an I component and a Q component, i.e. the capacitance value Cref.m and resistance value Rref.m of the reference load 105, and then the components may be transmitted by means of an output interface 2013 to another device or processor to judge whether the operation of the touch detection channel is normal.

In a similar way, the processor unit 201 applies a second carrier signal, for example a sinusoidal signal, to the touch detection sensor 103 by means of the transceiver 2011, via the touch detection channel 202; since the driver's hands are touching or gripping the steering wheel, the current capacitance value of the touch detection sensor 103 is Csen and the resistance value thereof is Rsen. The capacitance value Csen and resistance value Rsen of the touch detection sensor 103 modulate the second carrier signal to obtain a second carrier modulated signal; and the transceiver receives the second carrier modulated signal and transmits same to the IQ demodulator 2012. The received second carrier modulated signal may be demodulated to obtain an I component and a Q component, i.e. the capacitance value Csen and resistance value Rsen of the touch detection sensor 103, and then the components may be transmitted by means of the output interface 2013 to another device or processor to judge whether the driver has gripped the steering wheel.

The measurement result of the touch detection channel 202 not only depends on the magnitudes of the capacitance value and resistance value of the touch detection sensor 103 or reference load 105, but also depends on the frequency of the first carrier signal or second carrier signal, and the carrier signals may experience interference from other electromagnetic waves in the environment. Therefore, in order to more reliably test whether the touch detection channel 202 is operating normally, especially whether it can work normally when truly detecting the touch detection sensor 103, preferably the first carrier signal and the second carrier signal are the same, that is, have the same carrier waveform and carrier frequency. Therefore, the capacitance value Cref.m and resistance value Rref.m of the reference load 105, and the capacitance value Csen and resistance value Rsen of the touch detection sensor 103 modulate the same carrier signals. Thus, the process of using the touch detection channel 202 to detect the touch detection sensor 103 is fully simulated in the process of detecting the reference load 105, thereby further ensuring the reliability of verifying, by means of the reference load, whether the apparatus functions normally.

In a particular embodiment, in a processor chip such as AS8579 mentioned previously, the transmitter of the processor provides a sinusoidal voltage signal to act as a carrier signal for the reference load 105 or the touch detection sensor 103. The capacitance value Cref.m and resistance value Rref.m of the reference load 105 directly cause a change in the sinusoidal voltage signal, that is, the capacitance value Cref.m and resistance value Rref.m modulate the sinusoidal voltage signal. In addition, with regard to the touch detection sensor 103, when a person's hand approaches or presses on the touch detection sensor 103, the impedance value of the touch detection sensor 103 itself changes, that is, a new capacitance value Csen and resistance value Rsen are generated, and the new capacitance value Csen and resistance value Rsen likewise modulate the sinusoidal voltage signal. The voltage signal is converted to a current signal by the effects of capacitance and resistance, the current signal is received by a receiver of the processor unit and demodulated into an in-phase (I) component and an orthogonal (Q) component, and, after filtering and offset compensation of the I/Q signal, the measured value is converted into a digital value by the processor for further processing.

In the processes of using the touch detection channel 202 to respectively measure the reference load 105 and touch detection sensor 103, the touch detection channel 202 needs to switch between these two measurement processes. In an embodiment, the touch detection channel 202 may be connected to the reference load 105 and touch detection sensor 103 by means of a switch apparatus, and, when it is necessary to measure the reference load 105, the switch apparatus connects the reference load, and disconnects the touch detection sensor 103; when it is necessary to measure the touch detection sensor 103, the switch apparatus connects the touch detection sensor 103, and disconnects the reference load 105. In another embodiment, the processor unit 201, by means of the touch detection channel 202, by frequency-division multiplexing or time-division multiplexing, may apply the same carrier signal to the reference load 105 and touch detection sensor 103 simultaneously, and receive modulated signals. Next, the processor unit may process the signal from the reference load 105 and the signal from the touch detection sensor 103, respectively.

Figure 2C:
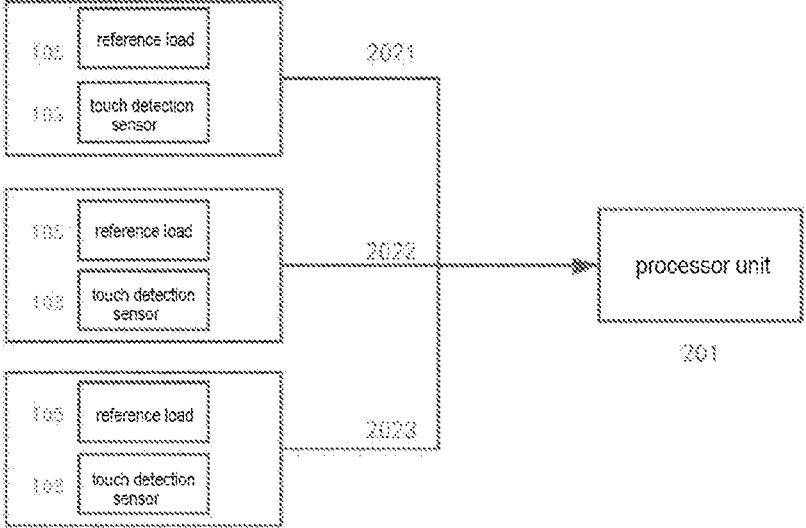
FIG. 2C shows a structural schematic diagram of an apparatus for steering wheel touch detection which has multiple touch detection channels.

FIG. 2C shows a structural schematic diagram of an apparatus for steering wheel touch detection which has multiple touch detection channels. In a situation in which the steering wheel is partitioned into multiple touch detection regions, a steering wheel touch operation may be determined on the basis of a touch detection result of at least one of the multiple touch detection regions; for example, as shown in FIG. 1B, the steering wheel is partitioned into three touch detection regions. For each touch detection region, a touch detection channel as shown in FIG. 2A is respectively implemented, i.e. touch detection channels 2021, 2022 and 2023. For each touch detection channel, a touch detection sensor 103 and reference load 105 are respectively provided, each reference load being configured with a preset reference capacitance value and reference resistance value. Each touch detection channel is not only used for measuring the capacitance value and resistance value of the touch detection sensor corresponding thereto, but is also used for measuring the capacitance value and resistance value of the reference load corresponding thereto. With regard to the corresponding touch detection channels 2021, 2022 and 2023, the processor unit 201 may determine whether the operation of the corresponding touch detection channel is normal, respectively on the basis of the preset reference capacitance value and reference resistance value of the corresponding reference load, and the measured capacitance value and resistance value of the reference load, and, in a situation in which it is determined that the operation of the corresponding touch detection channel is normal, the touch detection of the steering wheel is performed on the basis of the measured capacitance value and resistance value of the touch detection sensor; thus, whether a driver's hand is located in the corresponding touch detection region may be judged, and thereby the lying posture of the driver with respect to the steering wheel may be more accurately judged.

Figure 3A:
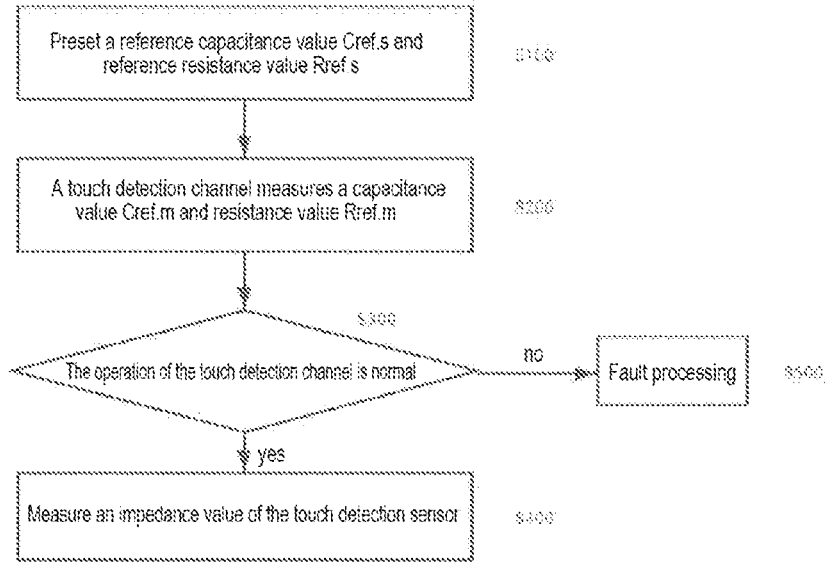
FIGS. 3A to 3C show flowcharts of methods for steering wheel touch detection according to the present disclosure.

FIG. 3A shows a flowchart of a method for steering wheel touch detection according to the present disclosure. For each touch detection channel, as explained with reference to FIG. 2A, the processor unit 201 first executes method step S100, that is, configures the reference load 105 with a preset reference capacitance value Cref.s and reference resistance value Rref.s. As mentioned above, it is necessary for the reference capacitance value Cref.s and reference resistance value Rref.s of the reference load to be non-constants. Therefore, for example, each time method step S100 is executed, the reference capacitance value Cref.s and reference resistance value Rref.s may be preset, so as to be different to the previously set reference capacitance value Cref.s and reference resistance value Rref.s. Alternatively, the reference capacitance value Cref.s and reference resistance value Rref.s may be randomly preset within a fixed range of variation. The fixed range of variation depends on an impedance detection range obtained by cooperation of the processor unit 201 and touch detection sensor 103, and this range is also a common range of impedance variation brought about by a driver's hand on the touch detection sensor 103. Taking the processor unit AS8579 as an example, same can sense a range of variation of capacitance values of 20-2000 pF. In this situation, the reference capacitance value Cref.s may be set to any value in the range 20-2000 pF.

After presetting is completed, method step S200 is executed, the touch detection channel 202 measures the reference load 105, to obtain the capacitance value Cref.m and resistance value Rref.m. Specifically, the processor unit 201 transmits a sinusoidal voltage as a carrier signal to the reference load 105, and the capacitance value Cref.m and resistance value Rref.m of the reference load 105 directly cause the sinusoidal voltage signal to change and generate a current signal, that is, the sinusoidal voltage signal is modulated. The current signal is received by the receiver of the processor unit and demodulated into an in-phase (I) component and an orthogonal (Q) component, and, after filtering and offset compensation of the I/Q signal, the processor unit obtains the capacitance value Cref.m and resistance value Rref.m of the current point in time.

Next, the processor unit 201 executes method step S300, and determines whether the operation of the touch detection channel 202 is normal, on the basis of the preset reference capacitance value Cref.s and reference resistance value Rref.s, and the measured capacitance value Cref.m and resistance value Rref.m. In an embodiment, the difference between the preset reference capacitance value Cref.s/reference resistance value Rref.s and the measured capacitance value Cref.m/resistance value Rref.m, respectively, may be found, and, if the difference value is respectively zero or within a predetermined deviation range, then the reference capacitance value Cref.s/reference resistance value Rref.s is considered to be equal to the measured capacitance value Cref.m/resistance value Rref.m, and thus it is determined that the touch detection channel works normally. Conversely, if one of the difference values exceeds the predetermined deviation range, then it is determined that a fault exists in the overall touch detection channel. Alternatively, the percentage of a change in the measured capacitance value Cref.m/resistance value Rref.m with respect to the preset reference capacitance value Cref.s/reference resistance value Rref.s may further be respectively calculated, that is, (Cref.m−Cref.s)/Cref.s and (Rref.m−Rref.s)/Rref.s. In another embodiment, the ratio of the preset reference capacitance value Cref.s/reference resistance value Rref.s to the measured capacitance value Cref.m/resistance value Rref.m may further be calculated, and, if the ratio is respectively one or within a predetermined deviation range, then the reference capacitance value Cref.s/reference resistance value Rref.s is considered to be equal to the measured capacitance value Cref.m/resistance value Rref.m, and thus it is determined that the touch detection channel works normally. Conversely, if one of the ratios exceeds the predetermined deviation range, then it is determined that a fault exists in the overall touch detection channel.

When the touch detection channel works normally, that is, in a situation in which a judgment result is "yes", measurement on the touch detection sensor is executed, that is, step S400. At this time, similar to S200, the transmitter of the processor unit 201 transmits a sinusoidal voltage, acting as a carrier signal, to the touch detection sensor 103, and the current capacitance value and resistance value of the touch sensor cause the sinusoidal voltage signal to change and generate a current signal, that is, the sinusoidal voltage signal is modulated. The current signal is likewise received by the receiver of the processor unit and demodulated into an in-phase (I) component and an orthogonal (Q) component, and, after filtering and offset compensation of the I/Q signal, the processor unit obtains the capacitance value Csen and resistance value Rsen of the touch detection sensor at the current point in time.

In an embodiment, the processor unit 201 may judge whether a driver is gripping the steering wheel according to capacitance values Csen and resistance values Rsen of the touch detection sensor obtained by measurement at different moments. For example, when a person's hand presses close to or grips the steering wheel, parasitic capacitance of the human body couples to the capacitive element of the touch detection sensor, such that the capacitance value of the capacitive element of the touch detection sensor increases, that is, the impedance value of the touch detection sensor 103 changes, and thus a new capacitance value Csen and resistance value Rsen cause a sinusoidal voltage signal to change and generate a current signal, that is, the sinusoidal voltage signal is modulated. The current signal is likewise received by the receiver of the processor unit and demodulated into an in-phase (I) component and an orthogonal (Q) component, and, after filtering and offset compensation of the I/Q signal, the processor unit obtains the capacitance value Csen and resistance value Rsen of the touch detection sensor at the current point in time. In this situation, for example, a capacitance value and resistance value of the touch detection sensor obtained by measurement at moment t1 are respectively Csen1 and Rsen1, and a capacitance value and resistance value of the touch detection sensor obtained by measurement at a slightly later moment t2 are respectively Csen2 and Rsen2. Generally, a change in the resistance value is not large. When the capacitance value Csen2 at moment t2 is greater than Csen1, it is determined that the driver's hand changes from a state of being separated from the steering wheel to a state of gripping the steering wheel. Conversely, if the capacitance value Csen2 is less than Csen1, it may be determined that the driver's hand separates from the steering wheel.

In another embodiment, the processor unit 201 may judge whether the driver is gripping the steering wheel according to multiple measurements of capacitance values Csen and resistance values Rsen of the touch detection sensor in a time period; for example, measurement of the touch detection sensor is continued multiple times at a specific frequency for 5 s, 10 s or 30 s, or a longer time, after the measured capacitance value increased the first time, and, if the capacitance value measured each time is basically the same, it is determined that the driver's hand really has gripped the steering wheel. Thus, the processor is prevented from wrongly judging, due to the driver deliberately or accidentally touching the steering wheel, that the driver has gripped the steering wheel.

If it is judged that the touch detection channel 202 does not work normally, according to step S300 described above, then the process flow passes to step S500 shown in FIG. 3A. Step S500 may be called a fault processing step. In the simplest embodiment, step S500 may directly issue a fault indication; for example, a prompt is provided to the driver by means of a warning light or onboard screen, so as to alert the driver that the touch detection channel 202 needs to be checked or serviced.

However, it is possible that the touch detection channel 202 itself can work normally, but due to some special reasons, the deviation, obtained in the judgment of step S300, of the measured capacitance value Cref.m or resistance value Rref.m from the preset capacitance value Cref.s or resistance value Rref.s is relatively large. In order to further ensure the reliability of checking the touch detection channel 202, with regard to these special reasons, it is necessary to adjust the checking process flow to remove interference of these special reasons as much as possible.

In this situation, the magnitude of the impedance of the reference load 105 may be affected by the surrounding environment and suddenly change, and thereby deviate from the reference capacitance value and resistance value preset by the processor unit 201. When the deviation exceeds a predetermined deviation range, it is judged in step S300 that a fault has occurred in the touch detection channel 202. In another situation, when the processor unit 201 presets the reference capacitance value and resistance value of the reference load 105, the presetting process does not succeed due to a short circuit or open circuit in the circuit around the reference load 105, and therefore the reference capacitance value and resistance value of the reference load 105 get stuck at the previously set values. This situation can also result in deviations of a subsequently measured reference capacitance value and resistance value from the preset reference capacitance value and resistance value exceeding the predetermined deviation range.

Figure 3B:
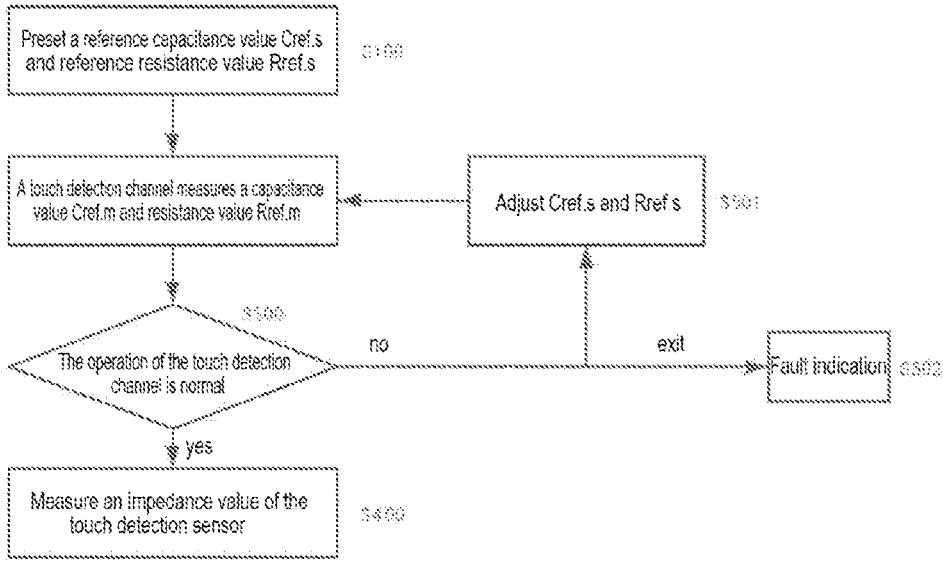

According to an advantageous embodiment of the method according to the present disclosure, with regard to the above two sets of circumstances which may occur, on the basis of the flowchart of the method for steering wheel touch detection shown in FIG. 3A, an extra step S501 is added, as shown in FIG. 3B. In a situation in which it is judged in method step S300 that the operation of the touch detection channel 202 is faulty, the preset reference capacitance value and reference resistance value of the reference load 105 are adjusted in method step S501, that is, their values are changed. The new reference capacitance value and reference resistance value may be randomly selected within a detection range obtained by the cooperation of the processor unit 201 and touch detection sensor 103. After completing method step S501, method step S200 is re-executed, that is, the touch detection channel 202 is used to measure a capacitance value and resistance value of the reference load after adjustment. In method step S300, the processor unit 201, on the basis of the adjusted preset reference capacitance value and reference resistance value, and measured capacitance value and resistance value, redetermines whether the operation of the touch detection channel is normal.

If it is judged in method step S300 that the touch detection channel 202 works normally, that is, interference produced by the special reasons mentioned above has been removed, then execution of step S400 may be proceeded with: the impedance of the touch detection sensor 103 is measured. If it is still judged in method step S300 that a fault has occurred in the touch detection channel 202, then it may be determined that a fault has occurred in the touch detection channel, and thus a fault indication may be issued in step S502; for example, a prompt is provided to the driver by means of a warning light or onboard screen, so as to alert the driver that the touch detection channel 202 needs to be checked or serviced.

In another embodiment, step S501 may be re-executed multiple times, and a loop-exit condition is added. By means of redundantly performing step S501, interference, caused by the special reasons mentioned above, with the judgment on whether the touch detection channel 202 operates normally can be removed to the greatest extent. Advantageously, the exit condition may be that step S501 has already been executed i times; for example, when i is equal to 3, 5 or 10, step S501 is not executed again and the loop is exited, and a fault indication is issued in step S502.

As well as unexpected changes of the reference capacitance value and reference resistance value of the reference load 105 itself causing a wrong judgment that a fault has occurred in the touch detection channel 202, such a wrong judgment can also be caused when the carrier signal is affected. As already mentioned above, today increasingly more control functions have been integrated on steering wheels for controlling multimedia and ADASs. In order to implement these control functions, a large amount of chips and corresponding circuits are necessarily mounted on the steering wheel, and data are transmitted between these chips. In addition, an electric drive system is further present in an electric vehicle, and strong electromagnetic interference can also be caused by transience of a high voltage and large current in a switch process of a high-power semiconductor switch device. This makes the electromagnetic environment in a steering wheel complicated; therefore, the processor unit 201 may also be affected by electromagnetic interference via the carrier signal and carrier modulated signal respectively sent and received by the touch detection channel 202, hence the carrier signal or carrier modulated signal is distorted, finally causing the magnitudes of the IQ demodulated capacitance value and resistance value to change. When the touch detection channel 202 detects the reference load 105, electromagnetic interference causes the demodulated capacitance value and resistance value of the reference load 105 to deviate, with respect to the resistance value of the capacitance value preset by the processor unit 201, from a predetermined deviation range. In this situation, it is wrongly judged in method step S300 that a fault has occurred in the touch detection channel 202.

Figure 3C:
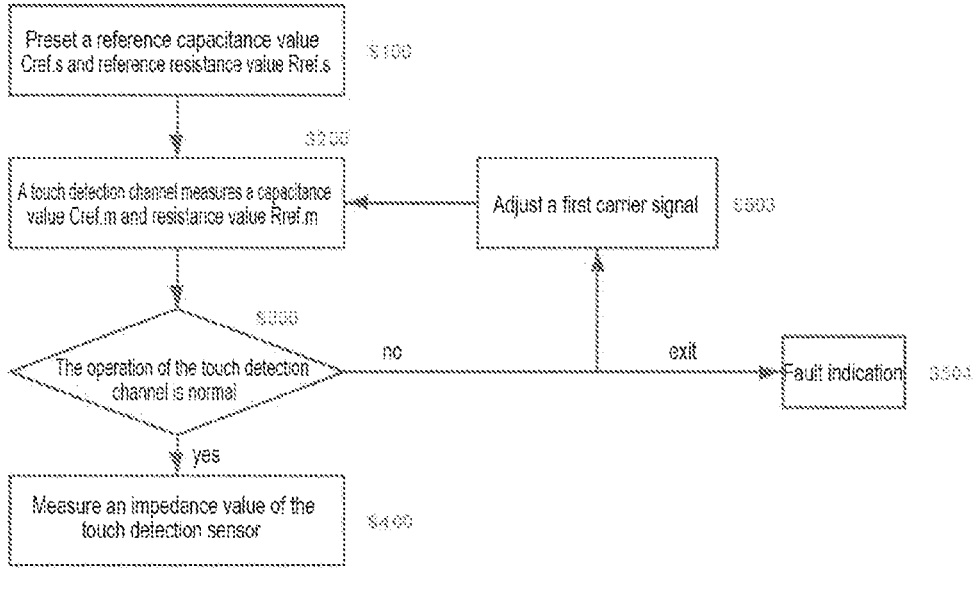

In order to eliminate the influence of electromagnetic interference as much as possible, on the basis of the flow-chart of the method for steering wheel touch detection shown in FIG. 3A, an extra step S503 is added. A flowchart of the improved method is shown in FIG. 3C. In a situation in which it is judged in method step S300 that the operation of the touch detection channel 202 is faulty, the carrier waveform and/or carrier frequency of the first carrier signal is adjusted in method step S503. The carrier signals generally used may be sinusoidal waves, rectangular waves and sawtooth waves. In method step S503, for example, a carrier signal may be converted from a sinusoidal wave to a rectangular wave or sawtooth wave. In addition, in method step S503, the frequency of the first carrier signal may further be changed within the working frequency of the transmitter and receiver of the processor unit 201, for example, between 45 and 125 kHz. Preferably, not only the waveform but also the frequency of the first carrier signal may further be changed in method step S503. Thus, the present electromagnetic interference is avoided to the greatest extent.

Next, method step S200 is performed again, and the touch detection channel 202 applies the adjusted first carrier signal to the reference load. The adjusted first carrier signal is modulated, by means of the capacitance value and resistance value of the reference load, to obtain an updated first carrier modulated signal. Next, the processor unit 201 performs IQ demodulation on the updated first carrier modulated signal, to finally obtain the capacitance value and resistance value of the reference load. Next, in method step S300, the processor unit 201, on the basis of the preset reference capacitance value and reference resistance value, and measured capacitance value and resistance value, judges whether the operation of the touch detection channel is normal, and, if the judgment result indicates normal operation, then execution of step S400 may be proceeded with: the impedance of the touch detection sensor 103 is measured. If it is still judged in method step S300 that a fault has occurred in the touch detection channel 202, then it may be determined that a fault has occurred in the touch detection channel, and thus a fault indication may be issued in step S504; for example, a prompt is provided to the driver by means of a warning light or onboard screen, so as to alert the driver that the touch detection channel 202 needs to be checked or serviced.

In another embodiment, similar to step S501, step S503 may be re-executed multiple times, and a loop-exit condition is added. By means of redundantly performing step S503, interference, possibly caused by electromagnetic interference, with the judgment on whether the touch detection channel 202 operates normally can be removed to the greatest extent. The loop-exit condition may be a number of times that the first carrier signal has been changed: in a situation in which only the carrier waveform is changed, the loop-exit condition may be that the first carrier signal has been changed 1, 2 or 3 times; in a situation in which the carrier frequency is changed, or both the carrier waveform and frequency are simultaneously changed, the loop-exit condition may be that the first carrier wave has been changed 4 or more times. When the loop-exit condition is reached, step S503 is not executed again and the loop is exited, and a fault indication is issued in step S504.

In a preferred embodiment, method step S501 and method step S503 may also be implemented in parallel. Specifically, for example, firstly method step S501 is executed once or multiple times, that is, the preset reference capacitance value and reference resistance value of the reference load 105 are adjusted once or multiple times, and, if after one or multiple executions of method step S501, it is always determined in method step S300 that a fault exists in the touch detection channel 202, then after the corresponding loop-exit condition is satisfied, execution of method step S503 begins, that is, the carrier waveform and/or carrier frequency of the first carrier signal is adjusted, and, in a situation in which step S503 is executed once or multiple times, if it is always determined in method step S300 that a fault exists in touch detection channel 202, then after the corresponding loop-exit condition is satisfied, a fault indication is issued. Conversely, if in any one of the above-mentioned loops, it is determined in method step S300 that the touch detection channel 202 operates normally, then execution of method step S400 may be proceeded with, that is, the touch detection sensor 103 is measured.

Alternatively, method step S501 and method step S503 may also be implemented in series. In one loop, not only are the preset reference capacitance value and reference resistance value of the reference load 105 adjusted, but also the carrier waveform and/or carrier frequency of the first carrier signal are adjusted, and, if it is determined in method step S300 that a fault exists in the touch detection channel 202, then the loop is repeated until the corresponding loop-exit condition is satisfied, and then a fault indication is issued.

In an advantageous embodiment, multiple touch detection sensors may be arranged in a touch detection region. Thus, for each touch detection sensor, a reference load corresponding thereto may be respectively provided, and, for each reference load, method steps S100 to S300, and possible method steps S501 and S502, as shown in FIGS. 3A-3C, are respectively executed to check whether the corresponding touch detection channel works normally. When it is determined that at least one of the multiple touch detection channels operates normally, the corresponding touch detection channel can be used to detect the touch detection sensor thereof, and thereby judge whether a driver's hand is located in this touch detection region. By means of arranging multiple touch detection sensors in a touch detection region, even in a situation in which an individual touch detection sensor or the touch detection channel corresponding thereto experiences a fault, the remaining touch detection sensors can detect whether the driver's hand is located in this touch detection region, thus further increasing the reliability of HOD.

The exemplary embodiments of the present disclosure described in detail above are merely descriptive, and not restrictive. Those skilled in the art should understand that various modifications and combinations may be made to these embodiments or features thereof without departing from the principles and spirit of the present disclosure, and such modifications shall fall within the scope of the present disclosure.

The invention claimed is:

1. A method for steering wheel touch detection, wherein the steering wheel is partitioned into at least one touch detection region, each touch detection region comprises at least one touch detection sensor, and each touch detection sensor is provided with a touch detection channel corresponding thereto, the method comprising:

for each touch detection channel:

configuring a reference load with a preset reference capacitance value and reference resistance value for testing by the touch detection channel;

measuring a capacitance value and resistance value of the reference load with the touch detection channel;

determining whether the operation of the touch detection channel is normal based on the preset reference capacitance and resistance values and the measured capacitance and resistance values; and in a situation in which it is determined that the operation of the touch detection channel is normal, using the touch detection channel to measure a capacitance and resistance value of the touch detection sensor corresponding to the touch detection channel to perform touch detection of the steering wheel on the basis of the measured capacitance value and resistance value of the touch detection sensor, wherein the touch detection channel is an IQ modulation-demodulation touch detection channel.

2. The method as claimed in claim 1, wherein for each touch detection channel, the preset reference capacitance value and reference resistance value corresponding to each touch detection channel are non-constants.

3. The method as claimed in claim 1, wherein measuring a capacitance and resistance value of the reference load with the touch detection channel comprises:

applying a first carrier signal to the reference load;

modulating the first carrier signal, with the capacitance value and resistance value of the reference load, to obtain a first carrier modulated signal; and using the touch detection channel to perform IQ demodulation on the first carrier modulated signal, to obtain a capacitance value and resistance value of the reference load.

4. The method as claimed in claim 3, wherein measuring a capacitance and resistance value of the touch detection sensor with the corresponding touch detection channel comprises:

applying a second carrier signal to the touch detection sensor;

modulating the second carrier signal with the touch detection sensor, to obtain a second carrier modulated signal; and using the touch detection channel to perform IQ demodulation on the second carrier modulated signal, to obtain a capacitance value and resistance value of the touch detection sensor.

5. The method as claimed in claim 4, wherein the first carrier signal and the second carrier signal are provided with the same carrier waveform and carrier frequency.

6. The method as claimed in claim 4, wherein the reference load is connected to the touch detection channel via a switch apparatus, wherein the switch apparatus is switched off during the process of measuring the touch detection sensor, and wherein the switch apparatus is switched on during the process of measuring the reference load.

7. The method as claimed in claim 3, wherein determining whether the operation of the touch detection channel is normal based on the preset capacitance value and preset resistance value, and the measured capacitance value and resistance value, comprises:

determining whether the operation of the touch detection channel is normal or whether a fault has occurred in the touch detection channel when the measured capacitance value deviates from the preset reference capacitance value within a predetermined deviation range, and when the measured resistance value deviates from the preset reference resistance value within a predetermined deviation range.

8. The method as claimed in claim 7, further comprising:

in a situation in which it is determined that the operation of the touch detection channel is faulty, adjusting the preset reference capacitance value and reference resistance value of the reference load;

measuring a capacitance value and resistance value of the reference load with the touch detection channel after adjustment; and determining whether the operation of the touch detection channel is normal based on the preset reference capacitance value and reference resistance value, and the measured capacitance value and resistance value.

9. The method as claimed in claim 7, further comprising:

in a situation in which it is determined that the operation of the touch detection channel is faulty:

adjusting the carrier waveform and/or carrier frequency of the first carrier, applying the adjusted first carrier signal to the reference load;

modulating the adjusted first carrier signal with the capacitance value and resistance value of the reference load, to obtain an updated first carrier modulated signal, and using the touch detection channel to perform IQ demodulation on the updated first carrier modulated signal, to obtain a capacitance value and resistance value of the reference load; and determining whether the operation of the touch detection channel is normal on the basis of the preset reference capacitance value and reference resistance value, and the measured capacitance value and resistance value.

10. The method as claimed in claim 1, wherein:

in a situation in which each touch detection region comprises multiple touch detection sensors, touching on the touch detection region is determined on the basis of measurement results of the multiple touch detection sensors of the touch detection region, the method further comprising:

in a situation in which the steering wheel is partitioned into multiple touch detection regions, determining a touch operation on the steering wheel on the basis of a touch detection result of at least one of the multiple touch detection regions.

11. An apparatus for steering wheel touch detection, wherein the steering wheel is partitioned into at least one touch detection region, wherein each touch detection region comprises at least one touch detection sensor, the apparatus comprising:

multiple touch detection channels, wherein for each touch detection channel there is a corresponding touch detection sensor, and wherein each touch detection channel is configured for measuring a capacitance value and resistance value of the corresponding touch detection sensor; and at least one reference load, wherein for each touch detection channel there is a corresponding reference load, wherein the reference load is configured with a preset reference capacitance value and reference resistance value, and wherein each touch detection channel is further used for measuring a capacitance value and resistance value of the corresponding reference load; and a processor unit configured to determine whether the operation of the touch detection channel is normal for each touch detection channel, wherein the operation of the touch detection channel is determined based on the preset reference capacitance value and reference resistance value of the reference load, and the measured capacitance value and resistance value of the reference load, and perform touch detection of the steering wheel on the basis of the measured capacitance value and resistance value of the touch detection sensor if the operation of the touch detection channel is determined to be normal, wherein the touch detection channel is an IQ modulation-demodulation touch detection channel.

12. The apparatus as claimed in claim 11, wherein the touch detection channel is configured to:

apply a first carrier signal to the reference load; and perform IQ demodulation on a first carrier modulated signal to obtain a capacitance value and resistance value of the reference load, wherein the first carrier modulated signal is obtained by modulation of the first carrier signal by the capacitance value and resistance value of the reference load.

13. The apparatus as claimed in claim 12, wherein the touch detection channel is configured to:

apply a second carrier signal to the touch detection sensor; and perform IQ demodulation on a second carrier modulated signal to obtain a capacitance value and resistance value of the touch detection sensor, wherein the second carrier modulated signal is obtained by modulation of the second carrier signal by the touch detection sensor.

14. The apparatus as claimed in claim 12, wherein the processor unit is configured to:

determine that the operation of the touch detection channel is normal, or otherwise determine that a fault has occurred in the touch detection channel when the measured capacitance and resistance values deviate from the preset reference capacitance and resistance values respectively within a predetermined deviation range.

15. The apparatus as claimed in claim 11, wherein the apparatus further comprises a switch apparatus, wherein the reference load is connected to the touch detection channel via the switch apparatus, wherein the switch apparatus is switched off during the process of measuring the touch detection sensor, and the switch apparatus is switched on during the process of measuring the reference load.

* * * * *